United States Patent
Martinez De La Cruz et al.

(10) Patent No.: US 9,503,483 B2
(45) Date of Patent: Nov. 22, 2016

(54) METHOD AND APPARATUSES FOR IDENTIFYING AND REPORTING QUALITY OF SERVICE RULES APPLICABLE TO A COMMUNICATION SESSION

(75) Inventors: Pablo Martinez De La Cruz, Madrid (ES); Miguel Angel Monjas Llorente, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 13/578,856

(22) PCT Filed: Feb. 16, 2010

(86) PCT No.: PCT/EP2010/051943
§ 371 (c)(1),
(2), (4) Date: Aug. 14, 2012

(87) PCT Pub. No.: WO2011/101021
PCT Pub. Date: Aug. 25, 2011

(65) Prior Publication Data
US 2012/0314632 A1 Dec. 13, 2012

(51) Int. Cl.
*H04L 29/06* (2006.01)
*H04L 12/14* (2006.01)
(Continued)

(52) U.S. Cl.
CPC ....... *H04L 65/1046* (2013.01); *H04L 65/1006* (2013.01); *H04L 65/1069* (2013.01);
(Continued)

(58) Field of Classification Search
CPC ............ H04L 65/1006; H04L 65/4076; H04L 65/80; H04L 65/1069; H04L 65/1046
(Continued)

(56) References Cited

U.S. PATENT DOCUMENTS 7,643,414 B1 * 1/2010 Minhazuddin ................. 370/230
2003/0123424 A1 * 7/2003 Jung ................... H04L 67/1023
370/338
(Continued)

FOREIGN PATENT DOCUMENTS

EP 1 898 591 3/2008
WO WO 2009/049684 4/2009

OTHER PUBLICATIONS

ETSI, Universal Mobile Telecommunications System (UMTS); Policy and charging control over Rx reference point (3GPP TS 29.214 version 7.4.0 Release 7), pp. 1-39.*
(Continued)

*Primary Examiner* — Kwang B Yao
*Assistant Examiner* — Ricardo Castaneyra
(74) *Attorney, Agent, or Firm* — Baker Botts, LLP

(57) ABSTRACT

According to the present invention there is provided a method of facilitating a communication session between a user terminal and an Application Function over an IP Connectivity Access Network in which a mobile IP-based mobility protocol is used. The method comprises, if it is determined that the Quality of Service rules for the communication session cannot be installed or enforced due to a limitation on the resources available in the Access Network, reporting this to the Application Function together with information on the available resources.

20 Claims, 6 Drawing Sheets

(51) Int. Cl.
*H04L 29/08* (2006.01)
*H04W 8/02* (2009.01)

(52) U.S. Cl.
CPC .......... *H04L 65/4076* (2013.01); *H04L 65/80* (2013.01); *H04L 12/14* (2013.01); *H04L 12/1407* (2013.01); *H04L 67/14* (2013.01); *H04W 8/02* (2013.01)

(58) Field of Classification Search
USPC ...... 370/230, 230.1, 231, 310; 455/405, 433
See application file for complete search history.

(56) References Cited

U.S. PATENT DOCUMENTS

| | | | |
|---|---|---|---|
| 2009/0228956 A1 | 9/2009 | He et al. | |
| 2009/0254494 A1* | 10/2009 | Li et al. | 705/400 |
| 2010/0017846 A1* | 1/2010 | Huang et al. | 726/1 |
| 2010/0217877 A1* | 8/2010 | Willars et al. | 709/228 |
| 2011/0161504 A1* | 6/2011 | Zhou et al. | 709/227 |
| 2011/0202647 A1* | 8/2011 | Jin et al. | 709/223 |

OTHER PUBLICATIONS

ETSI, Universal Mobile Telecommunications System (UMTS); LTE; Policy and charging control over Gx reference point (3GPP TS 29.212 version 8.4.0 Release 8), pp. 1-86.*
ETSI, Digital cellular telecommunications system (Phase 2+); Universal Mobile Telecommunications System (UMTS); LTE; Policy and Charging Control (PCC) over S9 reference point (3GPP TS 29.215 version 9.1.0 Release 9), pp. 1-39.*
International Search Report for PCT/EP2010/051943, mailed Jul. 8, 2010.
International Preliminary Report on Patentability for PCT/EP2010/051943, mailed Mar. 27, 2012.
"Policy and Charging Control in the Evolved Packet System" Jose-Javier Pastor Balbas, Stefan Rommer, and John Stenfelt, Feb. 2009.
3rd Generation Partnership Project; Technical Specification Group Services and System Aspects; Policy and charging control architecture (Release 7), 2008.
3rd Generation Partnership Project; Technical Specification Group Core Network and Terminals; 3GPP Evolved Packet System (EPS); Evolved General Packet Radio Service (GPRS); Tunnelling Protocol for Control plane (GTPv2-C); Stage 3 (Release 8), 2009.
"Mobility Support in IPv6" by D. Johnson et al., Jun. 2004.

* cited by examiner

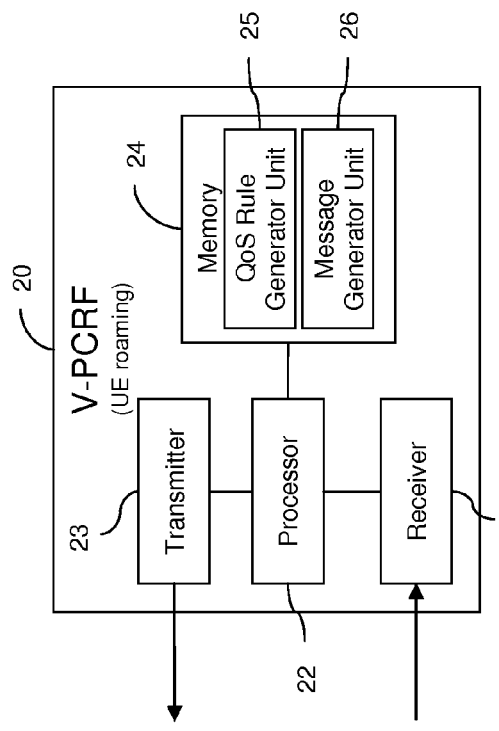
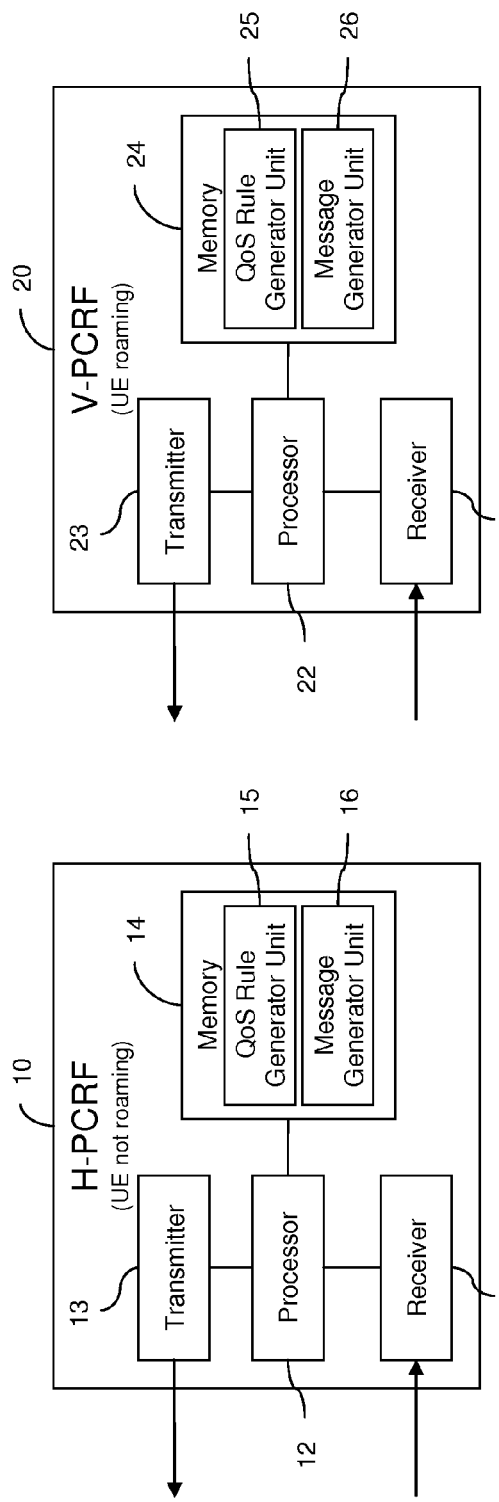
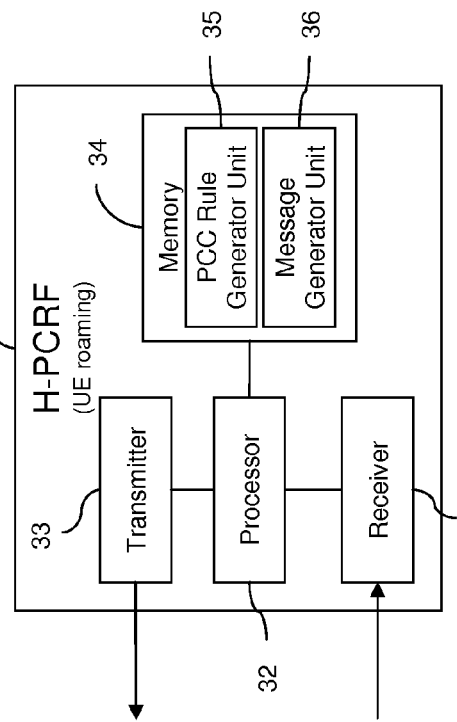

METHOD AND APPARATUSES FOR IDENTIFYING AND REPORTING QUALITY OF SERVICE RULES APPLICABLE TO A COMMUNICATION SESSION

This application is the U.S. national phase of International Application No. PCT/EP2010/051943 filed 16 Feb. 2010 which designated the U.S., the entire contents of which is hereby incorporated by reference.

TECHNICAL FIELD

The present invention relates to a method of facilitating a communication session. More particularly, the invention relates to facilitating a communication session between a user terminal and an Application Function when there is a limitation on the Quality of Service available in the access network.

BACKGROUND

Telecommunications services provided over an IP Connectivity Access Network (IP-CAN) can be subject to charging and policy control mechanisms. This includes service-aware Quality of Service (QoS) control. Accordingly, some telecommunications systems incorporate Policy and Charging Control (PCC) architectures to provide this control. 3GPP TS 23.203 describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Policy and Charging rules Function (PCRF), an Application Function (AF), an Online Charging System (OCS), an Offline Charging System (OFCS) and the Subscription Profile Repository (SPR). The architecture can also include a Bearer Binding and Event Reporting Function (BBERF).

The PCRF is a functional element that encompasses policy control decision and flow based charging control functionalities, a combination of the functionality of the Policy Decision Function (PDF) and the Charging rule Function (CRF) defined in release 6 of the 3GPP specification. A PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF receives session and media related information from the AF and informs the AF of traffic plane events. The PCRF also provides network control regarding the service data flow detection, gating, QoS and flow based charging (except credit management) towards the PCEF. The PCRF can provision PCC rules and PCC decisions to the PCEF via the Gx reference point and to the BBERF through the Gxx reference point. The PCRF also forwards events between the BBERF, the PCEF, and the AF. Criteria such as the QoS subscription information may be used together with policy rules such as, service-based, subscription-based, or pre-defined PCRF internal policies to derive the authorized QoS to be enforced for a service data flow. The PCRF PCC decisions may be based on one or more of the following:

information obtained from the AF via the Rx reference point, e.g. the session, media and subscriber related information;

information obtained from the PCEF via the Gx reference point, e.g. IP-CAN bearer attributes, request type, subscriber related information and location information;

information obtained from the SPR via the Sp reference point, e.g. subscriber and service related data;

information pre-defined in the PCRF; and information obtained from BBERF via the Gxa/Gxc (also referred to as Gxx) reference points.

The PCEF is a functional entity that behaves as a Policy Enforcing Point (PEP) for enforcing decisions instructed by the PCRF and the OCS. The PCEF provides service data flow detection (based on service data flow filters defined in the PCC rules) to capture and analyse any user and signalling traffic, to identify the user and to capture details of the service(s) being used. The PCEF can then communicate this user and access-specific information to the PCRF over the Gx interface, to the OCS over the Gy interface and to the OFCS over the Gz interface. The PCEF enforces QoS control according to the QoS authorised by the PCRF. The PCEF is preferably co-located within the gateway node implementing the IP access to the PDN (PDN GW). As such, in a GPRS core network the PCEF is located within the GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The OCS provides authorization for the usage of network resources based on the provisioned data and the user activity information it receives from PCEF. This authorization must be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

The AF is an element offering applications that require policy and/or charging control of the IP-CAN user plane behaviour. The AF communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth. The AF can also subscribe to certain events that occur at the traffic plane level (i.e., events detected by either the PCEF or be BBERF). Those traffic plane events include events such as IP session termination or access technology-type change. When the AF has subscribed to a traffic plane event, the PCRF informs the AF of its occurrence.

The SPR contains all subscriber/subscription related information needed for subscription-based policies and IP- CAN bearer level PCC rules by the PCRF. The Sp interface allows the PCRF to request subscription information related to the IP-CAN transport level policies from the SPR based on a subscriber ID and other IP-CAN session attributes.

The Evolved 3GPP telecommunications system provides support for different mobility protocols depending on which access technology is used. For 3GPP accesses (i.e. GERAN, UTRAN and E-UTRAN) the GPRS Tunnelling Protocol (GTP) or Proxy Mobile IPv6 (PMIPv6) can be used over the S5/S8 reference points. For Non-3GPP accesses it is possible to use Mobile IPv4 (MIPv4), Dual Stack MIPv6 (DSMIPv6) or PMIPv6 over the S2 reference point. These different protocols have different properties when it comes to how the bearers are implemented, and therefore place different requirements on the PCC architecture.

GTP not only carries mobility information but can also carry QoS, bearer signalling, etc. As such, when GTP is used between the Access Network GW (AN GW) (i.e. S-GW in a 3GPP access network) and the PDN-GW, the control signalling takes place over the same path as the user plane. This is therefore referred to as the 'on-path' model. The PCRF can therefore provide the authorised QoS information to the PCEF in the PDN GW over the Gx reference point. In contrast, mobile IP based protocols, such as MIP, PMIP or DSMIPv6, have not been designed to carry QoS information. As such, when one of these protocols is used between the AN GW and the PDN GW, the PCRF has to provide the authorised QoS information to a BBERF located in the AN GW over the Gxx reference point. This is therefore referred to as the 'off-path' mode, as the QoS signalling takes place on a path different to the user plane. The Gxx reference point represents the Gxa or Gxc reference points as applicable in each particular context. Gxc applies when the BBERF is located in the S-GW of a 3GPP access, whereas Gxa applies when the BBERF is located in a trusted non-3GPP access.

The BBERF supports a subset of the functions provided by the PCEF that includes bearer binding, uplink bearer binding verification and event reporting to the PCRF. Bearer binding is the association of a PCC rule and a QoS rule (if applicable) to an IP CAN bearer within that IP CAN session, and is performed by the Bearer Binding Function (BBF). The BBF is located at the PCEF if GTP is used as the mobility protocol towards the PCEF. Otherwise, where a mobile-IP based protocol, such as MIP, is used instead of GTP, the BBF is located at the BBERF. The QoS rules contain the information from the PCC rules that the BBERF requires to ensure that bearer binding can be performed. The QoS rules therefore contain the SDF template and precedence information, as well as the QoS information (e.g. QCI, bit rates etc). The PCRF provides the BBERF with the QoS rules derived from the PCC rules. The BBERF then enforces the QoS decisions by setting up the appropriate bearers.

The PCC architecture defined in 3GPP Release 8 supports roaming scenarios in which a subscriber can connect through a PDN GW in either the home network or in the visited network. However, control of enabled services and authorized resources are always handled by a PCRF in the subscriber's home network. The S9 reference point, between the home PCRF (H-PCRF) and a PCRF in the visited network (V-PCRF), has been defined in order to provide support for certain of these roaming scenarios. For those roaming scenarios in which the S9 reference point is used, the V-PCRF can reject policy decisions received from the home network, but cannot change them.

The two main roaming scenarios are home-routed access and visited access (also known as local breakout). In the home-routed access roaming scenario, an IP connection is established through a PDN GW in the home Public Land Mobile Network (H-PLMN). The PCEF connects (as usual) to the H-PCRF through Gx reference point, as illustrated schematically in FIG. 2. However, for certain scenarios, home-routed access may not be desired. For example, if the H-PLMN and the V-PLMN are geographically distant then it may be more suitable to use visited access. In visited access roaming, a PDN connection is established directly through a PDN GW in the V-PLMN, as illustrated schematically in FIG. 3.

According to current solutions the H-PCRF receives, from the AF, negotiated service information that will be used by the H-PCRF to determine the PCC rules that should apply for the AF session. These PCC rules include QoS parameters (bandwidth, QoS class Identifier, Allocation & Retention Priority) and optionally charging information. The H-PCRF then provides the PCC rules to the V-PCRF in the visited network. The V-PCRF then derives the QoS rules from the PCC rules, and sends the QoS rules to the GW (i.e. the PCEF in the PDN GW when GTP is used, or the BBERF in the AN GW when a MIP protocol is used). Upon receiving the QoS rules, the GW will proceed with the establishment of the appropriate bearer according to the provided QoS requirements. If there is a bearer already active that meets the QoS requirements, then that bearer will be modified instead of establishing a new bearer.

A problem arises when there is insufficient capacity to be allocated to a new data flow in the visited network. For example, a user is participating in a voice call and, at the same time, the user is browsing the internet over a visited LTE network. The user then decides that they want to add a streaming IPTV data flow. However, there is insufficient capacity available in the LTE network to support this service. In such circumstances there are currently three possible solutions, which are:

1. The AF (a streaming server in this case) can attempt to reinitiate the streaming data flow over another access.
2. The priority of an active data flow may be lowered to accommodate the new one. As a result of that, the previously active data flow might be dropped.
3. The AF may decide to reinitiate the streaming data flow by selecting a different codec that requires less bandwidth.

The first two solutions attempt to solve the problem whilst still providing the same service, with same quality as that which was initially requested, either by opening a new access connection, using another available access, or dropping other data flows. Such solutions can be considered as "aggressive" since it is the conditions in the access network that are made to accommodate the new streaming data flow, as opposed to modifying the data flow to take account of these conditions. These approaches might not be suitable in situations where limited bandwidth is available.

In contrast, the third solution suggests that the new streaming data flow may be "downgraded" in order to that it may be more easily accommodated by the access network. One way to achieve this downgrading of the streaming data flow is through the use of transcoding equipment, at some point between the AF and the UE, to lower the quality of streaming data flow. However, this approach consumes a significant amount processing and introduces further complexity into the network architecture.

An alternative approach requires that an end-to-end negotiation of the codec must be performed. In other words, the AF and the UE must together select a codec that they both support, by means of an offer-answer negotiation. To do so the UE provides the AF with a list of codecs that it supports, and the AF then chooses one of those codecs for the streaming data flow. The AF informs the UE of the codec to be used and bearer allocation is attempted. However, the success or failure of the allocation depends on the available resources. As such, if the bearer allocation fails, the AF and the UE must once again perform codec negotiation, selecting a codec with an even lower bit rate. As such, according to this approach, the first codec negotiation will begin with the desired codec and, after every unsuccessful attempt, a subsequent negotiation will downgrade the codec to one requiring less bandwidth until an attempt succeeds. This trial-and-error approach generates additional traffic as several attempts might be required before bearer establishment is successful, with the number of attempts made depending on the codec set supported by AF and UE, and the intelligence in the AF to skip unnecessary attempts.

SUMMARY

The present invention provides a method of facilitating a communication session between a user terminal and an Application Function over an IP Connectivity Access Network in which a mobile IP-based mobility protocol is used, wherein, if it is determined that the Quality of Service rules for the communication session cannot be installed or enforced due to a limitation on the resources available in the Access Network, then this is reported to the Application Function together with information on the available resources. The Application Function can then use the information on the available resources to determine if and/or how to establish the communication session.

According to a first aspect of the present invention there is provided a method of facilitating a communication session between a user terminal and an Application Function over an IP Connectivity Access Network in which a mobile IP-based mobility protocol is used. The method comprises, at a Policy and Charging Rules Function, receiving information on the resources required for the communication session, using the required resource information to determine one or more Quality of Service rules for the communication session, and sending the Quality of Service rules to a Bearer Binding Function. At the Bearer Binding Function, receiving the Quality of Service rules, and, if it is determined that the Quality of Service rules cannot be installed or enforced due to a limitation on the resources available in the Access Network, reporting this to the Policy and Charging Rules Function and including in the report information on the available resources. At the Policy and Charging Rules Function, receiving the report, and forwarding the information on the available resources towards the Application Function.

The user terminal and the Policy and Charging Rules Function may be located in a home network. If so, the information on the resources required for the communication session may comprise details of one or more media components of the communication session received from the Application Function. Also, the step of forwarding the information on the available resources towards the Application Function may comprise sending a further report including the information on the available resources to the Application Function.

Alternatively, the user terminal and the Policy and Charging Rules Function may be located in a visited network. If so, the information on the resources required for the communication session may comprise one or more Policy and Charging Control rules for the communication session received from a further Policy and Charging Rules Function in a home network. The further Policy and Charging Rules Function may determine the one or more Policy and Charging Control rules for the communication session using details of one or more media components of the communication session received from the Application Function. Also, the step of forwarding the information on the available resources towards the Application Function may then comprise sending a further report including the information on the available resources to the further Policy and Charging Rules Function, and the further Policy and Charging Rules Function forwarding the information on the available resources to the Application Function.

The details of the one or more media components of the session may be received from the Application Function in a Media-Component-Description AVP.

If the user terminal and the Policy and Charging Rules Function are located in a visited network, then a Policy and Charging Enforcement Function may be located in a home network. If this is the case, then the further Policy and Charging Rules Function may send the one or more Policy and Charging Control rules for the communication session to the Policy and Charging Enforcement Function. As such, after receiving the report from the Policy and Charging Rules Function, the further Policy and Charging Rules Function may send a request to the Policy and Charging Enforcement Function to remove the Policy and Charging Control rules. Alternatively, a Policy and Charging Enforcement Function may be located in the visited network. If this is the case, then the Policy and Charging Rules Function may send the one or more Policy and Charging Control rules for the communication session to the Policy and Charging Enforcement Function. As such, after receiving the report from the Bearer Binding Function, the Policy and Charging Rules Function may send a request to the Policy and Charging Enforcement Function to remove the Policy and Charging Control rules.

The method may further comprise, at the Application Function, receiving the information on the available resources, and using this information to determine whether and/or how to establish the communication session. The Application Function may then attempt to establish the communication session by modifying the resources that are required for the session to within the available resources. The Application Function may then send a request for the modified resources for the communication session to a Policy and Charging Rules Function. The information on the available resources may comprise the bandwidth available in the Access Network. If so, then the Application Function may attempt to establish the communication session using a codec whose bandwidth requirement is equal to or less than the available bandwidth.

According to a second aspect of the present invention there is provided a method of operating a Policy and Charging Rules Function to facilitate a communication session between a user terminal and an Application Function over an IP Connectivity Access Network in which a mobile IP-based mobility protocol is used. The method comprises receiving information on the resources required for the communication session, using this information to determine one or more Quality of Service rules for the communication session, sending the Quality of Service rules to a Bearer Binding Function, receiving a report from the Bearer Binding Function that the Quality of Service rules could not be installed or enforced due to a limitation on the resources available in the Access Network, the report including information on the available resources, and forwarding the information on the available resources towards the Application Function.

According to a third aspect of the present invention there is provided a method of operating a Bearer Binding Function to facilitate a communication session between a user terminal and an Application Function over an IP Connectivity Access Network in which a mobile IP-based mobility protocol is used. The method comprises receiving one or more Quality of Service rules from a Policy and Charging Rules Function, and if it is determined that the Quality of Service rules cannot be installed or enforced due to a limitation on the resources available in the Access Network, then reporting this to the Policy and Charging Rules Function and including in the report information on the available resources.

The Bearer Binding Function may be located at a Bearer Binding and Event Reporting Function.

According to a fourth aspect of the present invention there is provided a method of operating a Policy and Charging Rules Function to facilitate a communication session between a user terminal and an Application Function over an IP Connectivity Access Network in which a mobile IP-based mobility protocol is used, wherein the Policy and Charging Rules Function is located in a home network and the user terminal is located in a visited network. The method comprises receiving information on the resources required for the communication session from the Application Function, determining one or more Policy and Charging Control rules for the communication session using the required resource information, sending the Policy and Charging Control rules for the communication session to a further Policy and Charging Rules Function in the visited network, receiving a report from the further Policy and Charging Rules Function that the Policy and Charging Control rules could not be installed or enforced due to a limitation on the resources available in the Access Network, the report including information on the available resources, and forwarding the information on the available resources to the Application Function.

According to a fifth aspect of the present invention there is provided a method of operating an Application Function to facilitate a communication session with a user terminal over an IP Connectivity Access Network in which a mobile IP-based mobility protocol is used. The method comprises sending information on the resources required for the communication session to a Policy and Charging Rules Function, receiving a report from the Policy and Charging Rules Function that the communication session could not be established due to a limitation on the resources available in the Access Network, the report including information on the available resources, modifying the communication session to take account of the available resources, and sending further information on the modified resources required for the communication session to the Policy and Charging Rules Function.

The information on the available resources may be included in one of the Max-Requested-Bandwidth-UL AVP or Max-Requested-Bandwidth-DL AVP within a Diameter message. The Diameter message may be a Credit-Control-Request sent over the Gxx interface from the Bearer Binding Function to the Policy and Charging Rules Function. The Diameter message may also be a Credit-Control-Request sent over the S9 interface from the Policy and Charging Rules Function to the further Policy and Charging Rules Function. The Diameter message may also be an Abort-Session-Request sent over the S9 interface from either the Policy and Charging Rules Function or the further Policy and Charging Rules Function to the Application Function. The Result-Code AVP or Experimental-Result-Code AVP of the Diameter message may also include a value indicating that the Max-Requested-Bandwidth-UL AVP or Max-Requested-Bandwidth-DL AVP defines the resources available in the Access Network.

According to a sixth aspect of the present invention there is provided an apparatus configured to operate as a Policy and Charging Rules Function to facilitate a communication session between a user terminal and an Application Function over an IP Connectivity Access Network in which a mobile IP-based mobility protocol is used. The apparatus comprises a first receiver for receiving information on the resources required for the communication session, a processor for using this information to determine one or more Quality of Service rules for the communication session, a first transmitter for sending the Quality of Service rules to a Bearer Binding Function, a second receiver for receiving a report from the Bearer Binding Function that the Quality of Service rules could not be installed or enforced due to a limitation on the resources available in the Access Network, the report including information on the available resources, and a second transmitter for forwarding the information on the available resources towards the Application Function.

According to a seventh aspect of the present invention there is provided an apparatus configured to operate as a Bearer Binding Function to facilitate a communication session between a user terminal and an Application Function over an IP Connectivity Access Network in which a mobile IP-based mobility protocol is used. The apparatus comprises a receiver for receiving one or more Quality of Service rules from a Policy and Charging Rules Function, a processor for determining if the Quality of Service rules can be installed and enforced and, if it is determined that the Quality of Service rules cannot be installed or enforced due to a limitation on the resources available in the Access Network, for generating a reporting message including information on the available resources, and a transmitter for sending the reporting message to the Policy and Charging Rules Function.

According to an eighth aspect of the present invention there is provided an apparatus configured to operate as a Policy and Charging Rules Function to facilitate a communication session between a user terminal and an Application Function over an IP Connectivity Access Network in which a mobile IP-based mobility protocol is used, wherein the Policy and Charging Rules Function is located in a home network and the user terminal is located in a visited network. The apparatus comprises a first receiver for receiving information on the resources required for the communication session from the Application Function, a processor for determining one or more Policy and Charging Control rules for the communication session using the required resource information, a first transmitter for sending the Policy and Charging Control rules for the communication session to a further Policy and Charging Rules Function in the visited network, a second receiver for receiving a report from the further Policy and Charging Rules Function that the Policy and Charging Control rules can not be installed or enforced due to a limitation on the resources available in the Access Network, the report including information on the available resources, and a second transmitter for forwarding the information on the available resources to the Application Function.

According to a ninth aspect of the present invention there is provided an apparatus configured to operate as an Application Function to establish a communication session with a user terminal over an IP Connectivity Access Network. The apparatus comprises a first transmitter for sending information on the resources required for the communication session to a Policy and Charging Rules Function, a receiver for receiving a report from the Policy and Charging Rules Function that the communication session can not be established due to a limitation on the resources available in the Access Network, the report including information on the available resources, a processor for modifying the communication session to take account of the available resources, and a second transmitter for sending further information on the modified resources required for the communication session to the Policy and Charging Rules Function.

BRIEF DESCRIPTION OF THE DRAWINGS

FIG. 6 illustrates schematically an example of a H-PCRF according to an embodiment of the present invention;

FIG. 7 illustrates schematically an example of a V-PCRF according to an embodiment of the present invention;

FIG. 8 illustrates schematically an example of a H-PCRF according to an embodiment of the present invention;

DETAILED DESCRIPTION

In order to overcome, or at least mitigate the problems identified above, there will now be described a method of reporting the maximum bandwidth available in an access network, from the AN GW back to the PCRF that is responsible for authorising the resources, when a mobile IP-based mobility protocol is used. This information can then be used to successfully establish new data flows without disturbing any existing flows and without generating an excessive signalling traffic. For example, this method provides that a codec selection procedure (i.e. needed to overcome the allocation failure situation) can be performed using information on the bandwidth available in the access network, and therefore avoids unproductive trial-and-error iterations.

According to this method, after an initial failure to establish/allocate a bearer for the session between a UE and an AF, the BBREF reports the maximum bandwidth available and whether it is guaranteed or not, back to a PCRF. The PCRF then sends this bandwidth information back towards the AF. The AF can then use the available bandwidth information to inform its decision as to what action to take in an attempt to successfully establish the streaming flow. For example, the AF could decide to retry the current access using a codec with bandwidth requirements that fit within the available bandwidth, or try another access. However, if the AF were to try making use of a different access this may involve another unsuccessful allocation.

In a roaming scenario, in which the UE is located in a visited network (V-PLMN), the BBERF will report the maximum bandwidth available and whether it is guaranteed or not, back to the V-PCRF (over the Gxx reference point). The V-PCRF will then report this available bandwidth back to the H-PCRF (over the S9 reference point), which will in turn report the available bandwidth back to the AF (over the Rx reference point).

Figure 4:
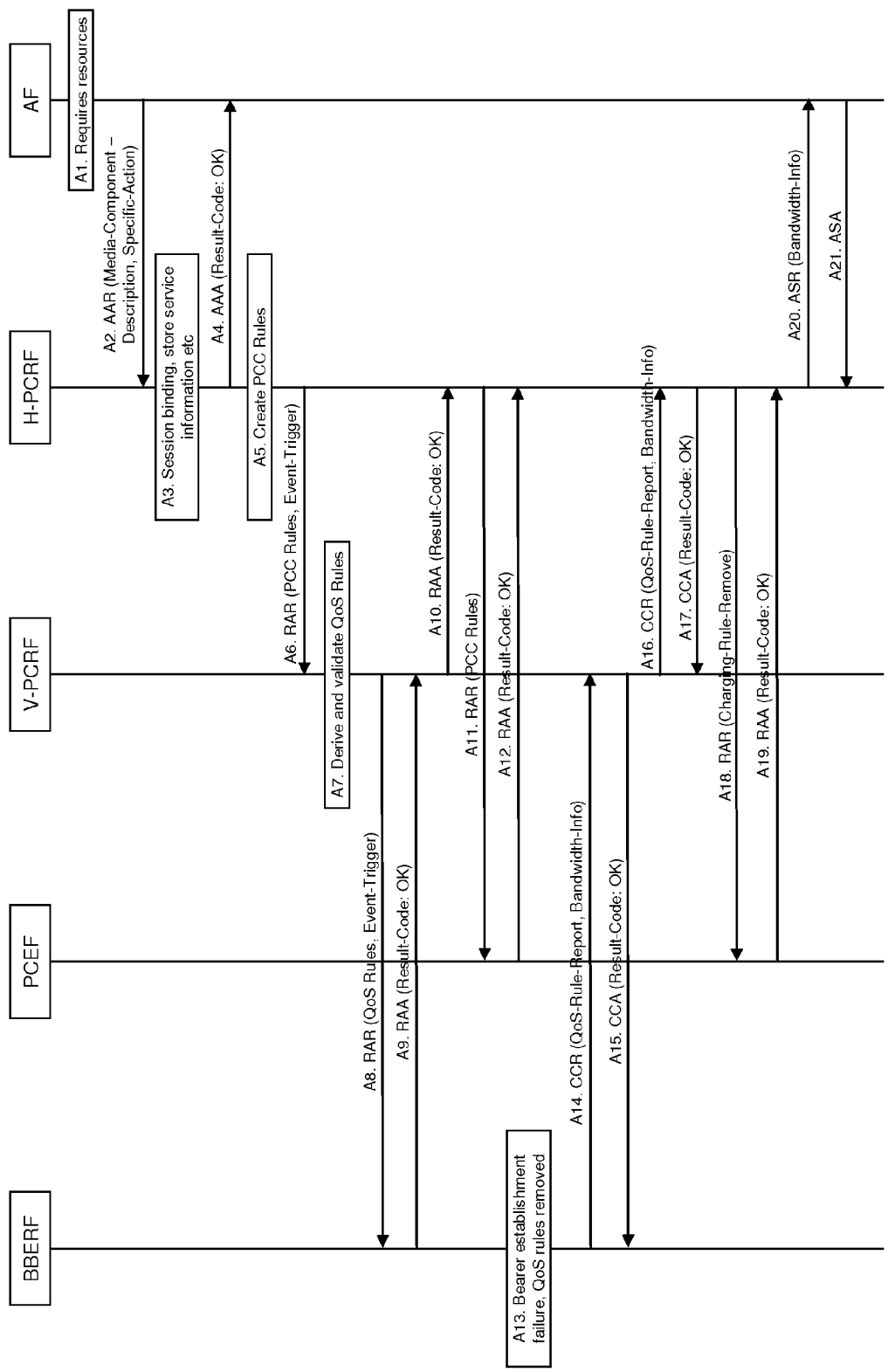
FIG. 4 illustrates an exemplary signalling flow diagram of an attempt to establish an AF session with a UE using home routed access according to an embodiment of the present invention.

FIG. 4 illustrates an exemplary signalling flow diagram of an attempt to establish an AF session with a UE using home-routed access, in which the visited network reports the maximum bandwidth available to a PCRF in the home network. The steps performed are as follows:

A1. The AF detects that resources are needed for streaming data (i.e. IPTV) to a UE.

A2. The AF sends an Authentication-Authorization-Request (AAR) message to the H-PCRF, over the Rx reference point, including information on the resources required for the streaming data service and including the IP address of the UE. The AAR message includes the service information for the media components of the AF session within Media-Component-Description AVP. This service information can include an application identifier, the type of media, bandwidth, IP address and port number for the AF session. The AAR message also includes the Specific-Action AVP with the INDICATION_OF_LOSS_OF_BEARER value in order to request that the H-PCRF provide a notification at the loss of a bearer for any of the media flows of the AF session.

A3. When the H-PCRF receives the AAR message from the AF, the PCRF performs session binding using the IP address of the UE as received from the AF. This session binding associates the service data flow with the IP CAN bearer that is intended to transport the service data flow. The H-PCRF stores the service information received in the Media-Component-Description AVPs, and checks that this service information is consistent with both the operator defined policy rules and the related subscription information received from the SPR during IP CAN session establishment.

A4. The H-PCRF replies by sending an Authentication-Authorization-Answer message to the AF.

A5. The H-PCRF uses the service information to create any PCC rules that are required for the streaming data service (i.e. for both audio and video media for an IPTV service).

A6. The H-PCRF determines that the user is roaming and sends a Re-Authorization-Request (RAR) message to the V-PCRF, over the S9 reference point, including the PCC rules. The RAR message also includes the LOSS_OF_BEARER value within the Event-Trigger AVP value in order to request that the V-PCRF provide a notification at the loss of a bearer for any of the media flows of the AF session.

A7. The V-PCRF derives the QoS rules from the PCC rules received in the RAR message, and validates the QoS rules against the service level agreements (SLA). If the QoS rules are not according to the SLA then a Re-Authorization-Answer (RAA) message is sent to the H-PCRF, over the S9 reference point, including the UNSUCCESSFUL-QOS-VALIDATION value in the Rule-Failure-Code AVP. The H-PCRF will then send a RAR message to the PCEF in order to remove the PCC rules, and will also send an Abort-Session-Request (ASR) message to the AF.

A8. If the validation of the QoS rules is successful then the V-PCRF sends a RAR message to the BBERF, over the Gxx reference point, including the QoS rules. The RAR message also includes the LOSS_OF_BEARER value within the Event-Trigger AVP in order to request that the BBERF provide a notification at the loss of a bearer for any of the media flows of the AF session.

A9. The BBERF installs, modifies or removes the QoS rules accordingly and replies to the V-PCRF with a RAA message. However, the QoS resource reservation has not yet been completed.

A10. The V-PCRF sends a RAA message to the H-PCRF to inform the H-PCRF that the QoS rules were installed. The H-PCRF receives the RAA message, indicating that QoS rules were successfully installed, and therefore assumes that the resource reservation was also successfully performed.

A11. The H-PCRF sends a RAR message to the PCEF, over the Gx reference point, including the PCC rules (i.e. the PCC rules are PUSHED to the PCEF).

A12. The PCEF installs, modifies or removes the PCC rules accordingly and replies to the H-PCRF with a RAA message.

A13. The AN-GW, at which the BBERF is located, attempts to establish/allocate an appropriate bearer according to the provided QoS requirements. However, limitations in the RAN cause the establishment/allocation of the bearer to fail. Due to the failure to reserve the resources, the BBERF removes the affected QoS rules.

A14. The BBERF determines that the 'loss of bearer' Event-Trigger has been met and therefore sends a Credit-Control-Request (CCR) message to the V-PCRF, over the Gxx interface, reporting the failure. The CCR message includes the QoS-Rule-Report AVP, and the Experimental-Result-Code AVP set to DIAMETER_QOS_RULE_EVENT, to report that the QoS rules could not be installed or enforced. The Rule-Failure-Code AVP may be set to. RESOURCE_ALLOCATION_FAILURE. The BBERF also includes the maximum available bandwidth (guaranteed or not) available for the bearer in the CCR message.

A15. The V-PCRF acknowledges receipt of the CCR, replying to the BBERF by sending a Credit-Control-Answer (CCA) message, without any QoS rules.

A16. The V-PCRF determines that the H-PCRF subscribed to the 'loss of bearer' Event-Trigger and therefore sends a CCR message to the H-PCRF, over the S9 interface, reporting the failure and that the QoS rules have been removed. The V-PCRF also includes the maximum available bandwidth (guaranteed or not), received from the BBERF, in the CCR message.

A17. The H-PCRF acknowledges receipt of the CCR message, replying to the V-PCRF by sending a CCA message.

A18. The H-PCRF sends a RAR message to the PCEF, over the Gx reference point, to remove the PCC rules from the PCEF (e.g. using the Charging-rule-Remove AVP).

A19. The PCEF removes the PCC rules and acknowledges receipt of the RAR message by sending a RAA message.

A20. The H-PCRF also determines that the AF subscribed to the 'indication of loss of bearer' Specific-Action and therefore sends an Abort-Session-Request (ASR) message to the AF, over the Rx reference point. The H-PCRF also includes the maximum available bandwidth (guaranteed or not), received from the V-PCRF, in the ASR message. If there were several data flows within the AF session and a bearer could not be allocated to any of those data flows, or if the session comprised only a single flow, then the PCRF would automatically inform the AF by sending an ASR, even if the AF had not subscribed to the 'indication of loss of bearer' Specific-Action.

A21. The AF acknowledges receipt of the ASR message by sending an Abort-Session-Answer (ASA) message to the H-PCRF.

Figure 5:
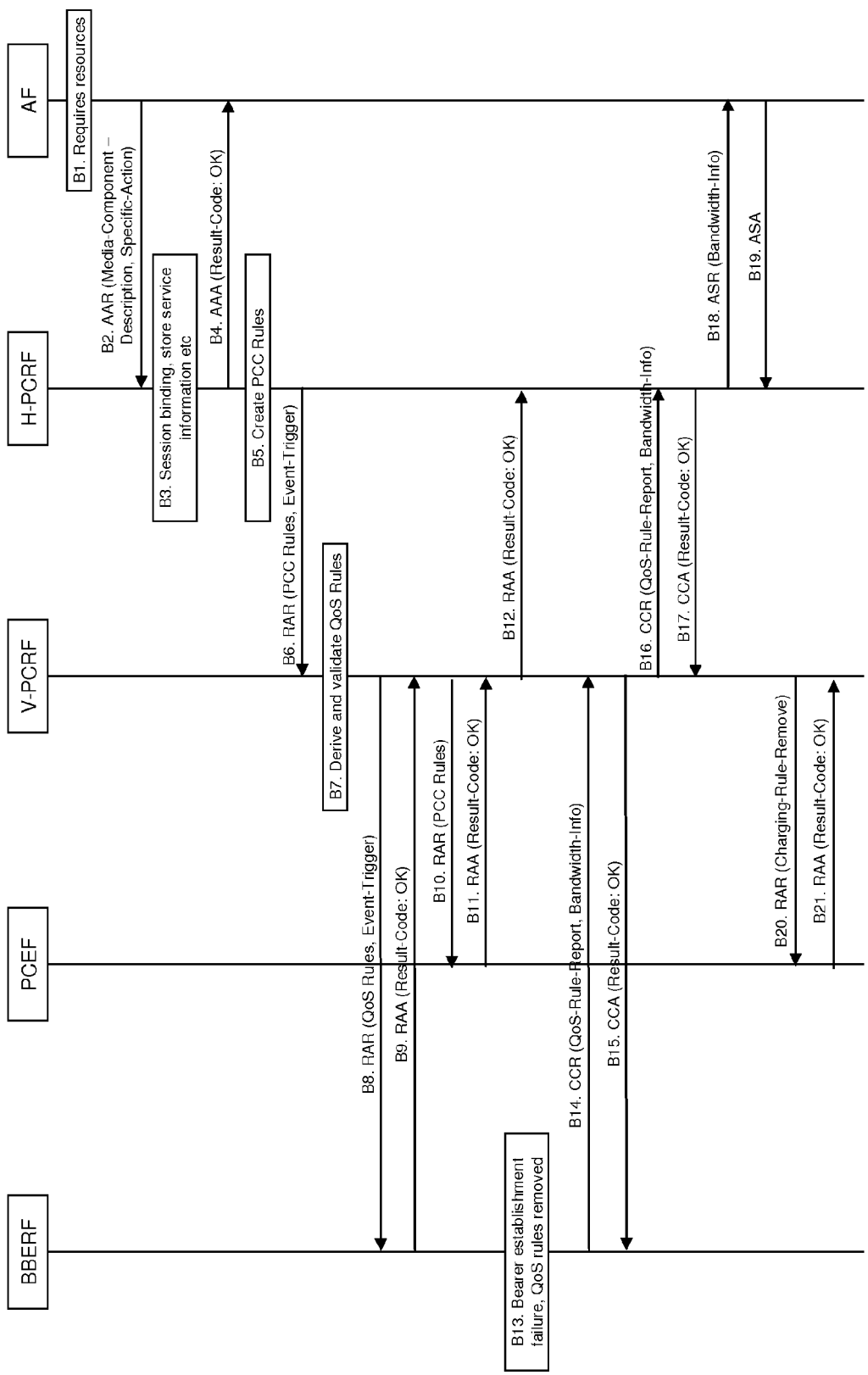
FIG. 5 illustrates an exemplary signalling flow diagram of an attempt to establish an AF session with a UE using visited access according to an embodiment of the present invention.

FIG. 5 illustrates an exemplary signalling flow diagram of an attempt to establish an AF session with a UE using visited access, in which the visited network reports the maximum bandwidth available to a PCRF in the home network. The steps performed are as follows:

B1. The AF detects that resources are needed for streaming data (i.e. IPTV) to a UE.

B2. The AF sends an AAR message to the H-PCRF, over the Rx reference point, including information on the resources required for the streaming data service (i.e. including the service information within Media-Component-Description AVP), and including the IP address of the UE. The AAR message also includes the Specific-Action AVP with the INDICATION_OF_LOSS_OF_BEARER value in order to request that the H-PCRF provide a notification at the loss of a bearer for any of the media flows of the AF session.

B3. When the H-PCRF receives the AAR message from the AF, the H-PCRF performs session binding using the IP address of the UE as received from the AF. This session binding associates the service data flow to the IP CAN bearer that it is intended will transport the service data flow. The H-PCRF stores the service information received in the Media-Component-Description AVPs, and checks that this service information is consistent with both the operator defined policy rules and the related subscription information received from the SPR during IP CAN session establishment.

B4. The H-PCRF then replies by sending an Authentication-Authorization-Answer message to the AF.

B5. The H-PCRF then uses the service information to create any PCC rules that are required from the streaming data service (i.e. for both audio and video media for an IPTV service).

B6. The H-PCRF determines that the user is roaming and sends a RAR message to the V-PCRF, over the S9 reference point, including the PCC rules. The RAR message also includes the LOSS_OF_BEARER value within the Event-Trigger AVP value in order to request that the V-PCRF provide a notification at the loss of a bearer for any of the media flows of the AF session.

B7. The V-PCRF derives the QoS rules from the PCC rules received in the RAR message, and validates the QoS rules against the SLA. If the QoS rules are not according to the SLA then a RAA message is sent to the H-PCRF, over the S9 reference point, including the UNSUCCESSFUL-QOS-VALIDATION value in the Rule-Failure-Code AVP. The H-PCRF will then send a RAR message to the PCEF in order to remove the PCC rules, and will also send an Abort-Session-Request (ASR) message to the AF.

B8. If the validation of the QoS rules is successful then the V-PCRF sends a RAR message to the BBERF, over the Gxx reference point, including the QoS rules. The RAR message also includes the LOSS_OF_BEARER value within the Event-Trigger AVP in order to request that the BBERF provide a notification at the loss of a bearer for any of the media flows of the AF session.

B9. The BBERF installs, modifies or removes the QoS rules accordingly and replies to the V-PCRF with a RAA message. However, the QoS resource reservation has not yet been completed.

B10. The V-PCRF sends a RAR message to the PCEF, over the Gx reference point, including the PCC rules (i.e. the PCC rules are PUSHED to the PCEF).

B11. The PCEF installs, modifies or removes the PCC rules accordingly and replies to the V-PCRF with a RAA message.

B12. The V-PCRF sends a RAA message to the H-PCRF to inform the H-PCRF that the QoS rules and the PCC rules were installed. The H-PCRF therefore assumes that the resource reservation was also successfully performed.

B13. The AN-GW, at which the BBERF is located, attempts to establish/allocate an appropriate bearer according to the provided QoS requirements. However, limitations in the RAN cause the establishment/allocation of the bearer to fail. Due to the failure to establish/allocate an appropriate bearer, the BBERF removes the affected QoS rules.

B14. The BBERF determines that the 'loss of bearer' Event-Trigger has been met and therefore sends a CCR message to the V-PCRF, over the Gxx interface, reporting the failure. The BBERF also includes the maximum available bandwidth (guaranteed or not) available for the bearer in the CCR message.

B15. The V-PCRF acknowledges receipt of the CCR, replying to the BBERF by sending a CCA message, without any QoS rules.

B16. The V-PCRF determines that the H-PCRF subscribed to the 'loss of bearer' Event-Trigger and therefore sends a CCR message to the H-PCRF, over the S9 interface, reporting the failure and that the QoS rules have been removed. The V-PCRF also includes the maximum available bandwidth (guaranteed or not), received from the BBERF, in the CCR message.

B17. The H-PCRF acknowledges receipt of the CCR message, replying to the V-PCRF by sending a CCA message.

B18. The H-PCRF determines that the AF subscribed to the 'indication of loss of bearer' Specific-Action and therefore sends an ASR message to the AF, over the Rx reference point. The H-PCRF also includes the maximum available bandwidth (guaranteed or not), received from the V-PCRF, in the ASR message. If there were several data flows within the AF session and a bearer could not be allocated to any of those data flows, or if the session comprised only a single flow, then the PCRF would automatically inform the AF by sending an ASR, even if the AF had not subscribed to the 'indication of loss of bearer' Specific-Action.

B19. The AF acknowledges receipt of the ASR message by sending an ASA message to the H-PCRF.

B20. The V-PCRF sends a RAR message to the PCEF, over the Gx reference point, to remove the PCC rules from the PCEF (e.g. using the Charging-Rule-Remove AVP).

B21. The PCEF removes the PCC rules and acknowledges receipt of the RAR message by sending a RAA message.

The S9, Rx and Gxx specifications currently define the Max-Requested-Bandwidth-UL and Max-Requested-Bandwidth-DL AVPs. However, these AVPs are defined as part of the AAA message, which is sent from the PCRF to the AF, and are used to indicate the maximum 'acceptable' bandwidth, which is the not the same as 'available' bandwidth. For example, when included in either an AAA message sent over the Rx interface, or even in an RAR message sent over the Gx or Gxx interfaces, the Max-Requested-Bandwidth-UL and Max-Requested-Bandwidth-DL AVPs indicate the maximum bandwidth 'acceptable' to the PCRF. In addition, when included in a RAR message sent over the S9 interface, used between the V-PCRF and the H-PCRF in roaming scenarios, the Max-Requested-Bandwidth-UL and Max-Requested-Bandwidth-DL AVPs indicate the maximum bandwidth 'acceptable' to the H-PCRF. As such, these AVPs cannot simply be 're-used' in order to provide the notification of the maximum bandwidth available.

The functionality required to provide the notification of the maximum available bandwidth is therefore not currently covered by the S9, Rx and Gxx specifications, such that these interfaces will require extension in order to implement the methods described above. In this regard, these interfaces could be extended to include a new AVP defined specifically for this purpose. Alternatively, an existing AVP could be amended to be able to include the available bandwidth. In this latter case, it may also be necessary to amend/specify another AVP to provide an indication that this AVP contains the available bandwidth information. For example, a message could include the available bandwidth information in an instance of the Max-Requested-Bandwidth-UL or Max-Requested-Bandwidth-DL AVPs. However, a new value for inclusion within the Result-Code AVP or Experimental-Result-Code AVP should also be defined and included within the message, in order to differentiate between messages reporting the acceptable bandwidth and those reporting the available bandwidth (i.e. the CCR and ASR messages).

In addition, in order to implement these methods the functionality of the UE, the BBERF, the H-PCRF, the V-PCRF and the AF require updating. The BBERF should be configured to report the available bandwidth information to the V-PCRF. The V-PCRF should be configured to report the available bandwidth information, received from the BBERF, to the H-PCRF. The H-PCRF should be configured to report the available bandwidth information, received from the V-PCRF, to the AF. In addition, both the UE and AF should be configured to perform codec negotiation using the available bandwidth information.

FIG. 6 illustrates schematically an example of a PCRF 10 in the subscriber's home network (H-PCRF), suitable for implementing the method described above when the user terminal is in the home network. The H-PCRF 10 can be implemented as a combination of computer hardware and software. The H-PCRF 10 comprises a receiver 11, a processor 12, a transmitter 13 and a memory 14. The memory 14 stores the various programmes that are implemented by the processor 14, together with any required data. These programmes include a QoS rule generator 15, and a message generator 16.

The receiver 11 receives information on the resources required for a session from the AF. For example, this resource information can be the media components for the session received in the Media-Component-Description AVP. The processor 12 then implements the QoS rule generator 15 which makes use of this information to determine the QoS rules for the session. The processor 12 then implements the message generator 16 to generate a message for sending to the BBERF, the message including the QoS rules. The message is sent to the BBERF using transmitter 14.

The receiver 11 then receives a message from the BBERF reporting that the QoS rules could not be installed or enforced due to a limitation on the resources available in the AN. The report includes information on the resources available in the AN. The processor 12 again implements the message generator 16 to generate a message for sending to the AF, the message including the information on the available resources.

FIG. 7 illustrates schematically an example of a PCRF 20 in a visited network (V-PCRF) suitable for implementing the method described above when the user terminal is roaming in the visited network. The V-PCRF 20 can be implemented as a combination of computer hardware and software. The V-PCRF 20 comprises a receiver 21, a processor 22, a transmitter 23 and a memory 24. The memory 24 stores the various programmes that are implemented by the processor 23, together with any required data. These programmes include a QoS rule generator 25, and a message generator 26.

The receiver 21 receives information on the resources required for a session from a PCRF in the subscriber's home network (H-PCRF), in the form of the PCC rules for the session. The processor 22 then implements the QoS rule generator 25 which makes use of this information to determine the QoS rules for the session. The processor 22 then implements the message generator 26 to generate a message for sending to the BBERF, the message including the QoS rules. The message is sent to the BBERF using transmitter 23.

The receiver 21 then receives a message from the BBERF reporting that the QoS rules could not be installed or enforced due to a limitation on the resources available in the AN. The report includes information on the resources available in the AN. The processor 22 again implements the message generator 26 to generate a message for sending to the H-PCRF, the message including the information on the available resources.

FIG. 8 illustrates schematically an example of a PCRF 30 in a home network (H-PCRF) suitable for implementing the method described above when the user terminal is roaming in a visited network. The H-PCRF 30 can be implemented as a combination of computer hardware and software. The H-PCRF 30 comprises a receiver 31, a processor 32, a transmitter 33 and a memory 34. The memory 34 stores the various programmes that are implemented by the processor 33, together with any required data. These programmes stored in the memory 34 include a PCC rule generator 35, and a message generator 36.

The receiver 31 receives information on the resources required for a session from the AF, in the form of the media components for the session. The processor 32 then implements the PCC rule generator 35 which makes use this information to determine the PCC rules for the session. The processor 32 then implements the message generator 36 to generate a message for PCC rules. The message is sent to the V-PCRF using transmitter 33.

The receiver 31 then receives a message from the V-PCRF reporting that the PCC rules could not be installed or enforced due to a limitation on the resources available in the AN. The report includes information on the resources available in the AN. The processor 32 again implements the message generator 36 to generate a message for sending to the AF, the message including the information on the available resources.

Figures 9, 10:
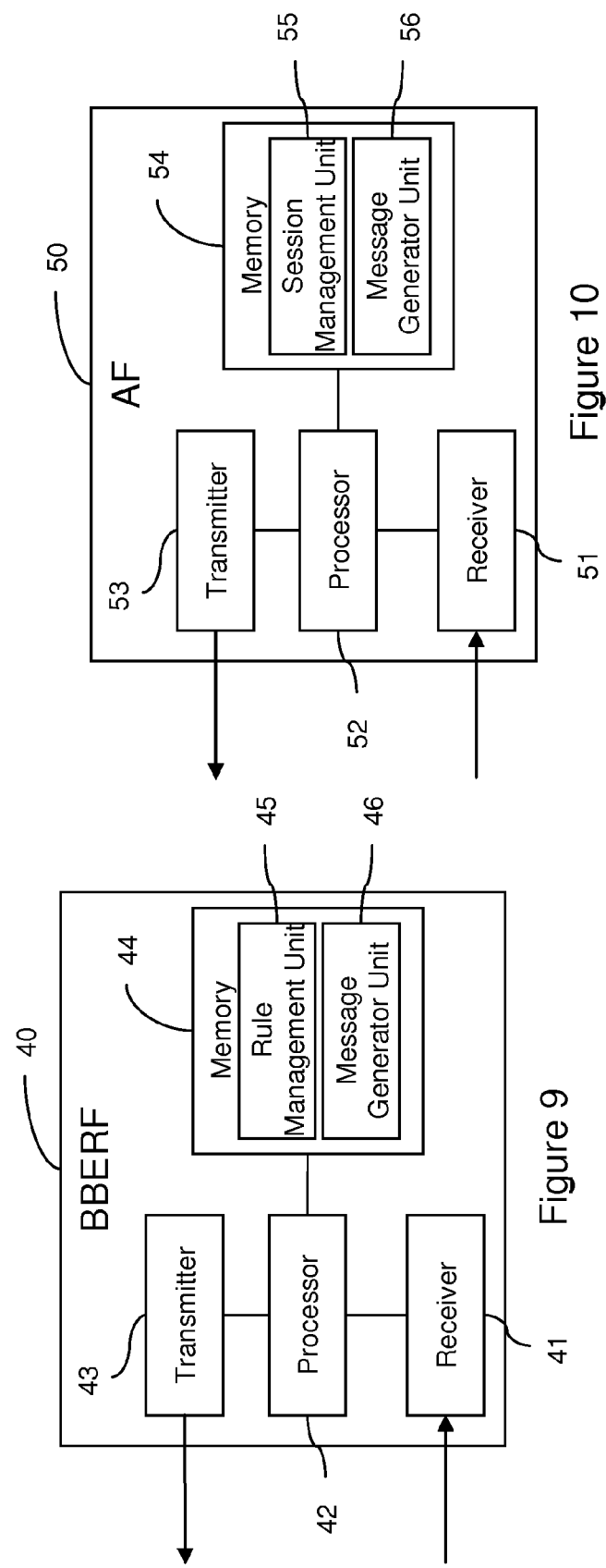
FIG. 9 illustrates schematically an example of a BBERF according to an embodiment of the present invention.
FIG. 10 illustrates schematically an example of an AF according to an embodiment of the present invention.

FIG. 9 illustrates schematically an example of a BBERF 40, providing the Bearer Binding Function, and suitable for implementing the method described above. The BBERF 40 can be implemented as a combination of computer hardware and software. The BBERF 40 comprises a receiver 41, a processor 42, a transmitter 43 and a memory 44. The memory 44 stores the various programmes that are implemented by the processor 43, together with any required data. These programmes stored in the memory include a rule management unit 45, and a message generator 46.

The receiver 41 receives QoS rules from a PCRF. If the user terminal is not roaming then these QoS rules will be received from the PCRF in the subscriber's home network (H-PCRF). However, if the user terminal is roaming, then the QoS rules via a PCRF in the visited network (V-PCRF). The processor 42 then implements the rule management unit 45 which attempts to establish/allocate an appropriate bearer sufficient for providing the required QoS, as defined by the received QoS rules. If the rule management unit 45 fails to establish/allocate an appropriate bearer, due to a limitation on the resources available in the AN, then the processor 42 implements the message generator 45 to generate a message for sending to the PCRF, reporting that the QoS rules cannot be installed or enforced and including details of the available resources. The message is sent to the PCRF, in the home or visited network as the case may be, using transmitter 43.

FIG. 10 illustrates schematically an example of an AF 50 suitable for implementing the method described above. The AF 50 can be implemented as a combination of computer hardware and software. The AF 50 comprises a receiver 51, a processor 52, a transmitter 53 and a memory 54. The memory 54 stores the various programmes that are implemented by the processor 53, together with any required data. These programmes stored in the memory include a session management unit 55, and a message generator 56.

The processor 52 implements the session management unit 55 in order to determine the resources required for a communication session with a user terminal. The processor 52 then implements the message generator 55 in order to generate a message including the information on the resources required for the communication session. The message including this information is then sent to a PCRF using transmitter 53.

The receiver 52 then receives a report from the PCRF that the session could not be established due to a limitation on the resources available in the AN, the report including information on the resources available in the AN. The processor 52 again implements the session management unit 55 in order to use the available resource information to determine if and how to proceed with the session between the AF and the UE. In particular, the session management unit 55 determines how the session can be modified to take account of the available resources. For example, the session management unit 55 determines if the resources required for the session can be reduced to a level that is within the available resources (i.e. by reducing the codec). The processor 52 then implements the message generator 56 to generate a further message including information on the modified resources required for the session. The message is sent to the PCRF using transmitter 53.

The methods described above provide that the AF and the PCRF can be informed about QoS limitations of the access network, such that the session establishment procedures performed by the AF and the policy decisions made by the PCRF can take into account the QoS currently available in the access network. This information can then be used to successfully establish new data flows without disturbing any existing flows and without generating an excessive signalling traffic (e.g. such as that required to perform multiple trial-and-error codec negotiations). Furthermore, this provides for improved user perception of the delivery of service provided by the AF.

Figure 1:
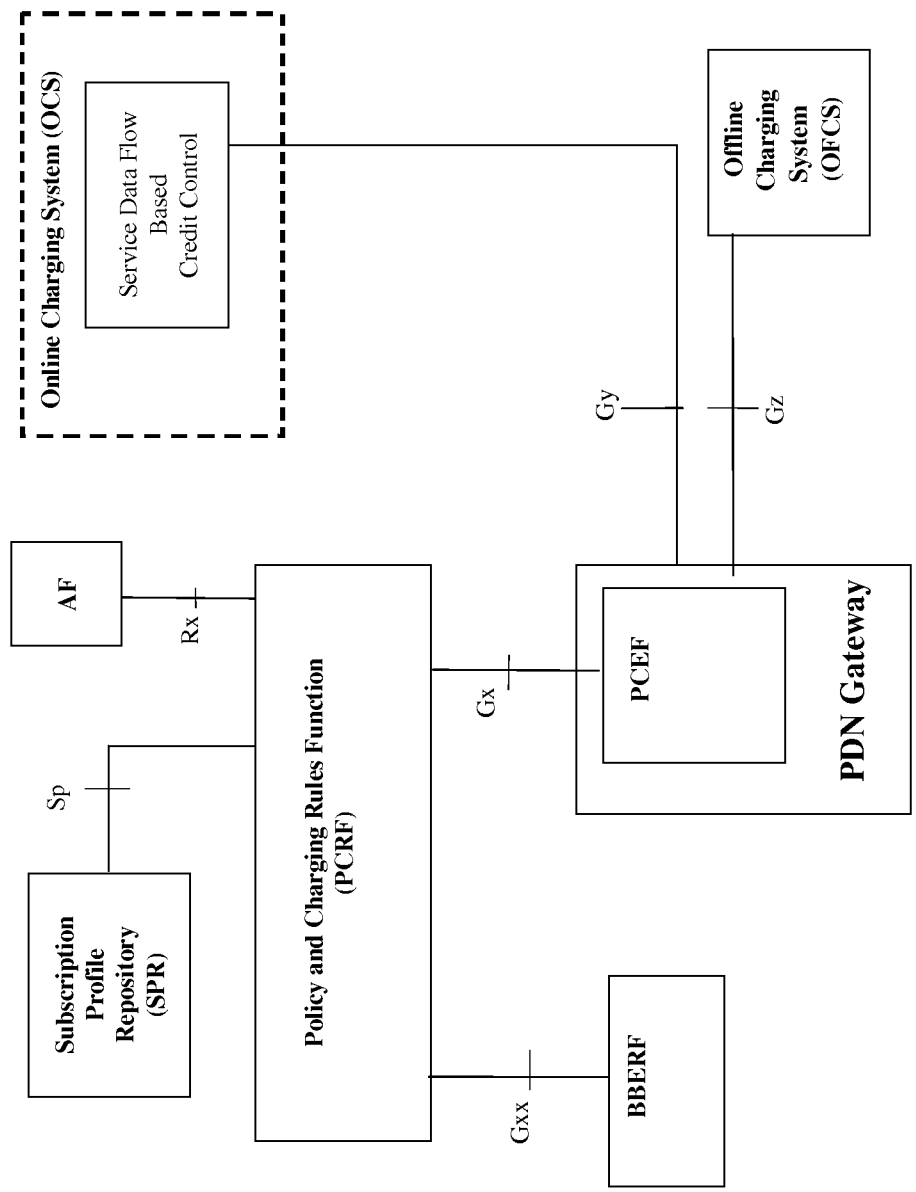
FIG. 1 illustrates schematically an example of PCC architecture in accordance with 3GPP TS 23.203.
Figure 3:
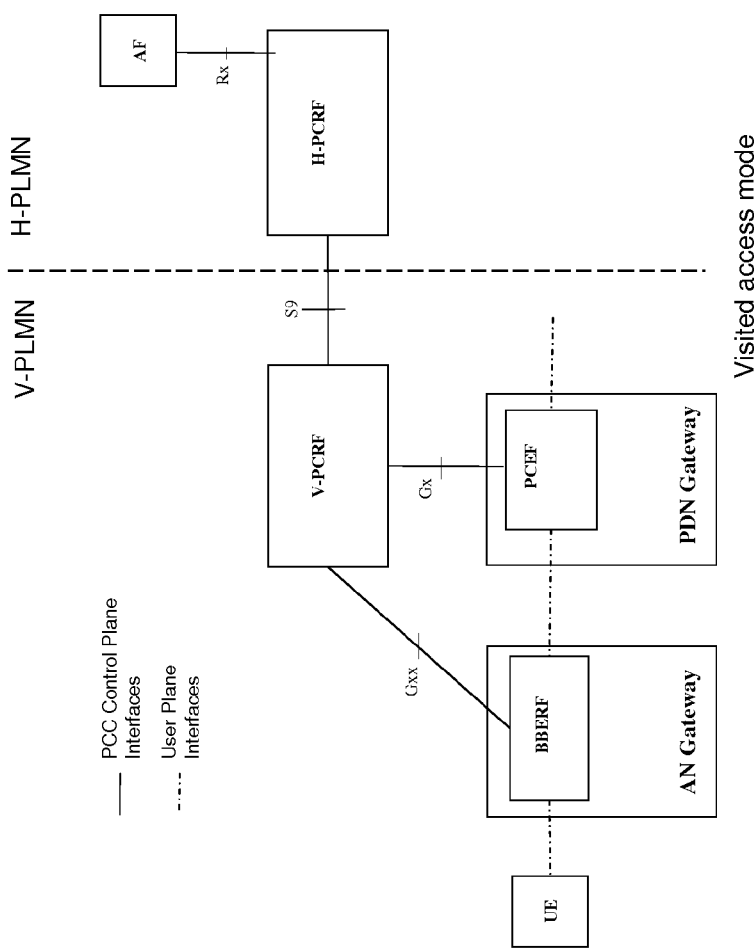
FIG. 3 illustrates schematically an example of a PCC architecture for roaming with visited access.
Figure 2:
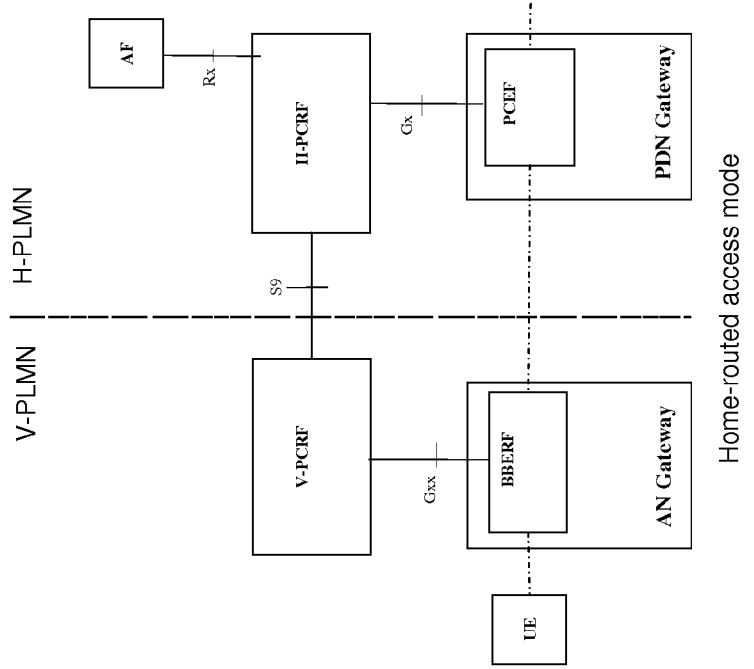
FIG. 2 illustrates schematically an example of a PCC architecture for roaming with home routed access.

Whilst it is proposed here that the BBERF report the available bandwidth back to the PCRF over the PCC control plane interfaces, as an alternative solution, it is possible to make use of the user plane interfaces. As illustrated in FIGS. 2 and 3, there are user plane interfaces between the PCEF and the BBERF that are based on either the GTP or the mobile IP protocols. If GTP is used between the AN GW and the PDN GW, then it is possible to pass the available bandwidth information from the AN GW to the PCEF. For example, the available bandwidth information could be included in the Bearer Resource Failure Indication message (see 3GPP TS 29.274). However, if a mobile IP protocol is used between the AN GW and the PDN GW, then it is not currently possible to pass on such bandwidth information. In order to allow the mobile IP protocols to carry such information, the Binding Acknowledgement Message within the Mobility Header (see IETF RFC 3775 clause 6.1.8) could be extended. For example, by defining a new QoS-specific mobility option.

It will be appreciated by the person of skill in the art that various modifications may be made to the above-described embodiments without departing from the scope of the present invention.

The invention claimed is:

1. A method of facilitating a communication session between a user terminal and an Application Function over an IP Connectivity Access Network in which a mobile IP-based mobility protocol is used, the method comprising:
   at a Policy and Charging Rules Function, receiving information on the resources required for the communication session, using the required resource information to determine one or more Quality of Service rules that indicate authorized resources for the communication session, and sending the Quality of Service rules to a Bearer Binding Function;
   at the Bearer Binding Function, receiving the Quality of Service rules that indicate authorized resources, and upon failure to establish or allocate an appropriate bearer for the Quality of Service rules, if it is determined that the Quality of Service rules cannot be installed or enforced due to insufficient resources available in the Access Network to reserve the authorized resources, reporting this to the Policy and Charging Rules Function and including in the report information on the available resources in the Access Network; and
   at the Policy and Charging Rules Function, receiving the report, and forwarding the information on the available resources in the Access Network towards the Application Function, and
   wherein the user terminal and the Policy and Charging Rules Function are located in a visited network, and
   wherein the step of forwarding the information on the available resources in the Access Network towards the Application Function facilitates roaming for the user terminal and comprises:
      sending a further report including the information on the available resources in the Access Network to a further Policy and Charging Rules Function in a home network; and
      the further Policy and Charging Rules Function forwarding the information on the available resources in the Access Network to the Application Function.

2. The method as claimed in claim 1, wherein the step of forwarding the information on the available resources in the Access Network towards the Application Function comprises:
   sending the further report including the information on the available resources in the Access Network to the Application Function.

3. The method as claimed in claim 1, wherein the information on the resources required for the communication session comprises one or more Policy and Charging Control rules for the communication session received from the further Policy and Charging Rules Function in the home network.

4. The method as claimed in claim 1, wherein a Policy and Charging Enforcement Function is located in the home network.

5. The method as claimed in claim 1, wherein a Policy and Charging Enforcement Function is located in the visited network.

6. The method as claimed in claim 1, and further comprising:
   at the Application Function, receiving the information on the available resources in the Access Network, and using this information to determine whether and/or how to establish the communication session.

7. The method as claimed in claim 6, wherein the Application Function attempts to establish the communication session by modifying the resources that are required for the session in accordance with the available resources in the Access Network.

8. The method as claimed in claim 1, wherein the information on the available resources in the Access Network comprises the bandwidth available in the Access Network.

9. The method as claimed in claim 8, wherein the Application Function attempts to establish the communication session using a codec whose bandwidth requirement is equal to or less than the available bandwidth in the Access Network.

10. A method of operating a Policy and Charging Rules Function to facilitate a communication session between a user terminal and an Application Function over an IP Connectivity Access Network in which a mobile IP-based mobility protocol is used, the method comprising:
    receiving information on the resources required for the communication session from the Application Function;
    using this information to determine one or more Quality of Service rules that indicate authorized resources for the communication session;
    sending the Quality of Service rules to a Bearer Binding Function;
    receiving a report from the Bearer Binding Function that the Quality of Service rules could not be installed or enforced due to insufficient resources available in the Access Network to reserve the authorized resources, the report including information on the available resources in the Access Network; and
    forwarding the information on the available resources in the Access Network towards the Application Function, and
    wherein the user terminal and the Policy and Charging Rules Function are located in a visited network, and
    wherein the step of forwarding the information on the available resources in the Access Network towards the Application Function facilitates roaming for the user terminal and comprises:

sending a further report including the information on the available resources in the Access Network to a further Policy and Charging Rules Function in a home network; and the further Policy and Charging Rules Function forwarding the information on the available resources in the Access Network to the Application Function.

11. A method of operating a Bearer Binding Function to facilitate a roaming communication session between a user terminal in a visited network and an Application Function over an IP Connectivity Access Network in which a mobile IP-based mobility protocol is used, the method comprising:

receiving one or more Quality of Service rules, which indicate authorized resources for the communication session, from a Policy and Charging Rules Function in the visited network; and upon failure to establish or allocate an appropriate bearer for the Quality of Service rules, if it is determined that the Quality of Service rules cannot be installed or enforced due to insufficient resources available in the Access Network to reserve the authorized resources, then reporting this to the Policy and Charging Rules Function in the visited network and including in the report information on the available resources in the Access Network for forwarding to a further Policy and Charging Rules Function in a home network and Application Function.

12. The method as claimed in claim 11, wherein the Bearer Binding Function is located at a Bearer Binding and Event Reporting Function.

13. A method of operating a Policy and Charging Rules Function to facilitate a roaming communication session between a user terminal and an Application Function over an IP Connectivity Access Network in which a mobile IP-based mobility protocol is used, wherein the Policy and Charging Rules Function is located in a home network and the user terminal is located in a visited network, the method comprising:

receiving, by the Policy and Charging Rules Function in the home network, information on the resources required for the communication session from the Application Function;

determining, by the Policy and Charging Rules Function in the home network, one or more Policy and Charging Control rules that indicate authorized resources for the communication session using the received information on the required resources;

sending, by the Policy and Charging Rules Function in the home network, the Policy and Charging Control rules that indicate the authorized resources for the communication session to a further Policy and Charging Rules Function in the visited network to facilitate roaming for the user terminal;

receiving a report from the further Policy and Charging Rules Function in the visited network indicating that the Policy and Charging Control rules could not be installed or enforced due to insufficient resources available in the Access Network to reserve the authorized resources, the report including information on the available resources in the Access Network; and forwarding, by the Policy and Charging Rules Function in the home network, the information on the available resources in the Access Network to the Application Function.

14. A method of operating an Application Function located in a home network to facilitate a roaming communication session with a user terminal located in a visited network over an IP Connectivity Access Network in which a mobile IP-based mobility protocol is used, the method comprising:

sending information on the resources required for the communication session to a Policy and Charging Rules Function located in the home network;

receiving, by the Application Function from the Policy and Charging Rules Function located in the home network, a report forwarded from another Policy and Charging Rules Function located in the visited network indicating that the communication session could not be established due to insufficient resources available in the Access Network to reserve authorized resources in accordance with the required resources, the report including information on the available resources in the Access Network;

modifying the communication session to take account of the available resources in the Access Network; and sending further information on the modified resources required for the communication session to the Policy and Charging Rules Function located in the home network for further forwarding to the Policy and Charging Rules Function located in the visited network.

15. The method as claimed in claim 14, wherein the information on the available resources in the Access Network is included in one of a Max-Requested-Bandwidth-UL AVP or Max-Requested-Bandwidth-DL AVP within a Diameter message.

16. The method as claimed in claim 15, wherein a Result-Code AVP or Experimental-Result-Code AVP of the Diameter message includes a value indicating that the Max-Requested-Bandwidth-UL AVP or Max-Requested-Bandwidth-DL AVP defines the resources available in the Access Network.

17. An apparatus configured to operate as a Policy and Charging Rules Function to facilitate a communication session between a user terminal and an Application Function over an IP Connectivity Access Network in which a mobile IP-based mobility protocol is used, the apparatus comprising:

a first receiver for receiving information on the resources required for the communication session from the Application Function;

a processor for using this information to determine one or more Quality of Service rules that indicate authorized resources for the communication session;

a first transmitter for sending the Quality of Service rules to a Bearer Binding Function;

a second receiver for receiving a report from the Bearer Binding Function that the Quality of Service rules could not be installed or enforced due to insufficient resources available in the Access Network to reserve the authorized resources, the report including information on the available resources in the Access Network; and a second transmitter for forwarding the information on the available resources in the Access Network towards the Application Function, and wherein the user terminal and the apparatus operating as the Policy and Charging Rules Function are located in a visited network, and wherein forwarding the information on the available resources in the Access Network towards the Application Function facilitates roaming for the user terminal and comprises:

sending a further report including the information on the available resources in the Access Network to a further Policy and Charging Rules Function in a home network; and the further Policy and Charging Rules Function forwarding the information on the available resources in the Access Network to the Application Function.

18. An apparatus configured to operate as a Bearer Binding Function to facilitate a roaming communication session between a user terminal in a visited network and an Application Function over an IP Connectivity Access Network in which a mobile IP-based mobility protocol is used, the apparatus comprising:

a receiver for receiving one or more Quality of Service rules, which indicate authorized resources, from a Policy and Charging Rules Function located in the visited network;

a processor for determining if the Quality of Service rules can be installed and enforced and, upon failure to establish or allocate an appropriate bearer for the Quality of Service rules, if it is determined that the Quality of Service rules cannot be installed or enforced due to insufficient resources available in the Access Network to reserve the authorized resources, for generating a reporting message including information on the available resources in the Access Network; and a transmitter for sending the reporting message to the Policy and Charging Rules Function in the visited network for forwarding to a further Policy and Charging Rules Function and Application Function in the home network.

19. An apparatus configured to operate as a Policy and Charging Rules Function to facilitate a roaming communication session between a user terminal and an Application Function over an IP Connectivity Access Network in which a mobile IP-based mobility protocol is used, wherein the Policy and Charging Rules Function is located in a home network and the user terminal is located in a visited network, the apparatus comprising:

a first receiver for receiving information on the resources required for the communication session from the Application Function;

a processor for determining one or more Policy and Charging Control rules that indicate authorized resources for the communication session using the required resource information;

a first transmitter for sending the Policy and Charging Control rules that indicate the authorized resources for the communication session to a further Policy and Charging Rules Function in the visited network to facilitate roaming for the user terminal;

a second receiver for receiving a report from the further Policy and Charging Rules Function in the visited network indicating that the Policy and Charging Control rules could not be installed or enforced due to insufficient resources available in the Access Network to reserve the authorized resources, the report including information on the available resources in the Access Network; and a second transmitter for forwarding the information on the available resources in the Access Network to the Application Function.

20. An apparatus configured to operate as an Application Function to facilitate a roaming communication session with a user terminal over an IP Connectivity Access Network, wherein the Application Function is located in a home network and the user terminal is located in a visited network, the apparatus comprising:

a first transmitter for sending information on the resources required for the communication session to a Policy and Charging Rules Function located in the home network;

a receiver for receiving, from the Policy and Charging Rules Function located in the home network, a report forwarded from another Policy and Charging Rules Function located in the visited network indicating that the communication session could not be established due to insufficient resources available in the Access Network to reserve authorized resources in accordance with the required resources, the report including information on the available resources in the Access Network;

a processor for modifying the communication session to take account of the available resources in the Access Network; and a second transmitter for sending further information on the modified resources required for the communication session to the Policy and Charging Rules Function located in the home network for further forwarding to the Policy and Charging Rules Function located in the visited network.

* * * * *